Nov. 14, 1967     R. M. JOHNSON     3,353,097

METHOD AND APPARATUS FOR OPTICALLY DETERMINING
THE ALIGNMENT OF MAGNETIC FIELDS UTILIZING
THE COTTON-MOUTON EFFECT

Filed March 10, 1964

INVENTOR.
RUDIN M. JOHNSON
BY
ATTORNEY.

3,353,097
METHOD AND APPARATUS FOR OPTICALLY DETERMINING THE ALIGNMENT OF MAGNETIC FIELDS UTILIZING THE COTTON-MOUTON EFFECT
Rudin M. Johnson, Berkeley, Calif., assignor to the United States of America as represented by the United States Atomic Energy Commission
Filed Mar. 10, 1964, Ser. No. 350,928
8 Claims. (Cl. 324—43)

ABSTRACT OF THE DISCLOSURE

This invention is an optical device for visually locating the transverse axis of multiple-pole magnet fields. A cell containing a liquid solution which exhibits the Cotton-Mouton effect is disposed in the field to intercept a beam of plane-polarized light directed axially therethrough. Upon viewing the cell through a crossed analyzer screen, the light is extinguished along each axis where the field lines are either parallel or perpendicular to the polarizing planes and the intersection of the darkened axes exactly reveals the center of symmetry of the field.

---

Figure 1:
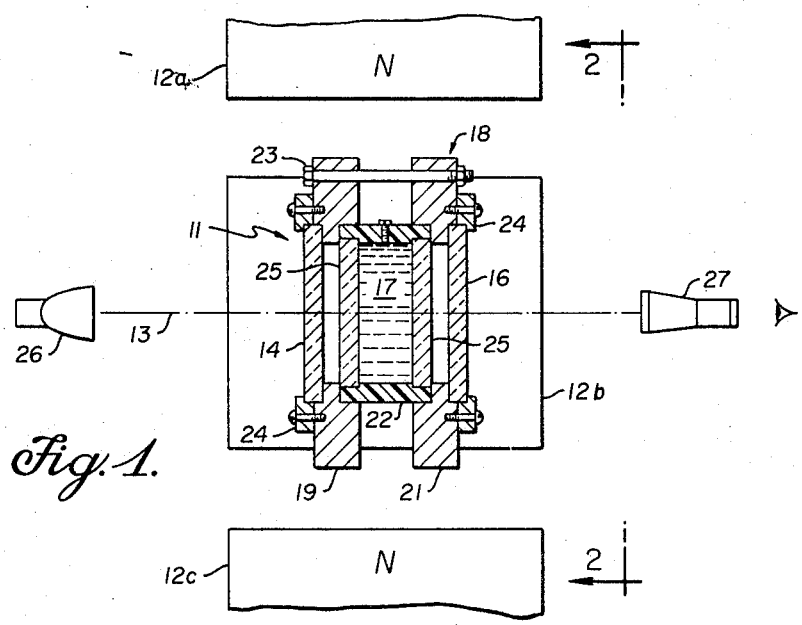

The present invention relates to magnetic field measurement and more particularly to a method and apparatus for making visible certain points, lines and regions within a magnetic field and for facilitating the measurement of magnetic field strength. In general, the invention functions to give a visible indication of null field regions and regions where the field is parallel or perpendicular to a selected reference line. The invention herein described was made in the course of, or under, Contract W-7405-eng-48 with the United States Atomic Energy Commission.

The invention is particularly useful for aligning the magnetic fields which are used extensively in charged particle accelerators for guiding and focussing charged particle beams. The placement of focussing magnets and the subsequent location of the magnetic field with respect to the desired beam axis is a critical aspect of transporting charged particle beams into, through, and out of accelerators. Any significant dispersion of the beam particles from this axis seriously reduces the usefulness and efficiency of the accelerator.

Accurate alignment of the focussing magnet field centers to within thousandths of an inch of the beam axis is often necessary. Unfortunately, magnetic fields do not lend themselves readily to practical means of observation. The most common and convenient method of determining the field center between quadrupole, sextapole, or higher order multiple magnet poles is to assume that the magnetic center corresponds to the geometric center of the field space. This can be a fairly good approximation providing the magnets have been carefully constructed and have not been operated into saturation. An alternate and more reliably accurate method is to probe the field space with a rotating coil or wire orbit and locate the center from the measurements obtained thereby. It can be seen that this procedure is very tedious and time consuming particularly when several magnets must be located. For example, there are 73 quadrupole focussing magnets in a bevatron injector linear accelerator at Lawrence Radiation Laboratory, University of California, each requiring alignment to one-thousandth of an inch of the beam center.

The present method and apparatus provides for optically locating the center of complex multiple pole magnetic fields in order that alignment may be readily accomplished and has the combined advantages of speed, high accuracy, and convenience. The invention makes use of the physical phenomenon known as the Cotton-Mouton effect wherein double refraction of light is produced in certain liquids by the presence of a magnetic field. Elliptical polarization due to the double refraction can be observed optically, and in the present case, is made to indicate characteristics of the geometry of the magnetic field.

In a preferred form, the invention utilizes a small and compact optical system which is placed within the magnet field. The optical system includes a liquid cell containing an optically and magnetically active solution, disposed between a pair of crossed plane polarizing screens which are transverse to the centerline of the field. In the absence of the magnetic field, light directed through the system is completely extinguished by the crossed polarizers. Upon energizing the field, anisotropic molecules of the solution align with the magnetic field and cause the plane polarized light entering the cell to become elliptically polarized. The vectorial component of the elliptical polarization which lies in a plane parallel to the polarizing plane of the analyzer (second polarizing) screen will thus be transmitted thereby and the light beam will no longer be completely suppressed. However, in those regions of the field space where the field strength is zero, or where the field configuration is such that there is no transmissible component of the elliptical polarization, the light will continue to be extinguished by plane polarization. Thus, a readily visible pattern of light and dark will appear in the solution and be seen through the analyzer according to the above conditions. Since any higher-order multiple pole magnet configuration produces a zero field at the center of the field space, the lens pattern will reveal a dark spot thereat. In the particular case of the commonly used quadrupole magnet, the lens pattern will reveal a dark orthogonal cross, centered on the field axis.

Inasmuch as the null field axis of the focussing lens is literally made visible by this means, the lens may readily be physically positioned to bring the axis into coincidence with a predetermined particle path. A telescope of the type employed on a surveyor's transit for example may be sighted along the predetermined path and the lens may then be positioned to center the pattern exhibited by the cell on the crosshairs of the telescope.

It is therefore an object of this invention to provide a method and apparatus by which certain geometrical characteristics of a magnetic field may be made visible.

It is an object of the present invention to provide an improved method and apparatus for accurately determining the center of certain forms of magnetic field.

It is an object of the invention to provide for visually locating null field zones within a magnetic field.

It is another object of the present invention to facilitate the accurate alignment of focussing magnets in charged particle accelerators and the like.

It is a further object of the invention to provide for a visible indication of the effective center of multi-pole magnetic focussing lenses.

It is still another object of the present invention to provide a method and means for accurately locating and visually observing the axis of the field in magnetic charged particle guidance systems such as quadrupole lenses.

It is another object of the invention to facilitate the measurement of magnetic field strength.

Figure 2:
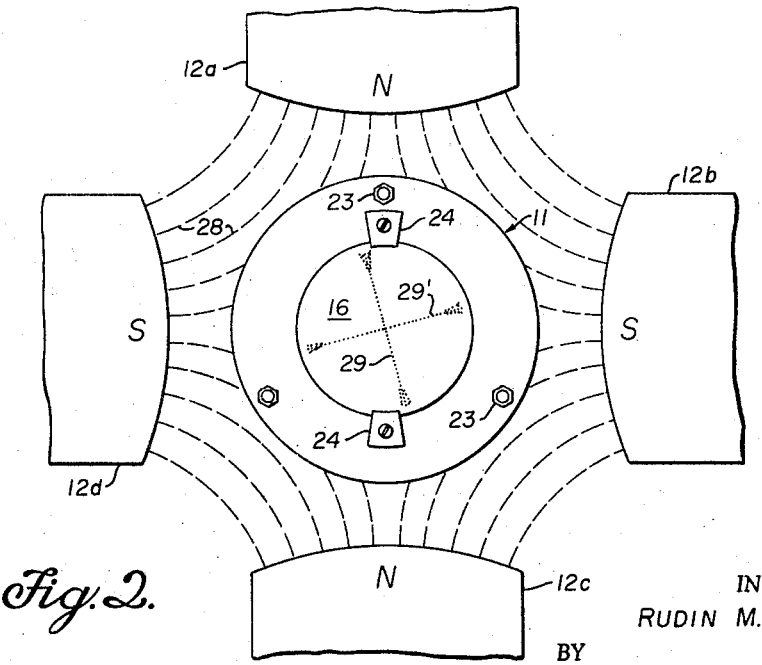

The invention, both as to its organization and method of operation, together with further objects and advantages thereof, will be best understood with reference to the following specification taken in conjunction with the accompanying drawing, of which:

FIGURE 1 is an axial section view of the cell assembly of the invention positioned in the field of a quadrupole magnet charged particle beam lens, and FIGURE 2 is a view taken along line 2—2 of FIGURE 1 and showing the light pattern exhibited by the cell assembly of FIGURE 1 in the particular magnet structure shown.

Referring now to FIGURES 1 and 2 of the drawing in conjunction, a cell unit 11 suitable for practicing the invention is shown disposed within the central field area of a quadrupole magnet 12 which is typical of the type of magnet to which the invention is applicable, the general construction and method of operation of the quadrupole lens 12 being well understood within the art. As shown in FIGURE 2 in particular, such a lens includes four magnet poles 12a, 12b, 12c and 12d arranged in quadrature around the axis of the lens with opposite poles having like polarity to provide a hyperbolic field in each quadrant of a plane normal to the axis. The cell 11 is oriented therein with the optical axis 13 of the cell aligned with the geometrical center line of the quadrupole magnet 12. Such alignment does not require precise coincidence of these axes, but merely an essentially parallel orientation whereby the optical members lie in the planes of the field lines 28.

The cell assembly 11 comprises a spaced pair of plane polarizing screens 14 and 16 of circular configuration which are separated by a liquid cell 17 containing a magnetically and optically active solution which will hereinafter be more fully described. The three components 14, 16 and 17 are mounted in a frame 18. The frame 18 and all component parts thereof should be fabricated from non-magnetic materials in order to prevent disturbance of the field in which the device is to be used.

The frame 18 of a present embodiment of the invention includes two similar annular members 19 and 21, the faces of which are recessed around the inner circumference to accommodate fitting the optical components therein. The container flask of the liquid cell 17, comprised of a cylinder 22 and glass end walls 25, is held between the frame members 19 and 21 by bolts 23 which are inserted between the members at points radially outward from flask cylinder 22, the bolts being formed of brass or other suitable non-magnetic material. The polarizing screens 14 and 16 are mounted in the outer recesses of the frame members 19 and 21, respectively, and are held therein by clamps 24 attached to the frames, the screens being rotatable. The cell assembly 11 may be supported in position in the field area by any suitable means adapted to the physical arrangement of the particular magnet undergoing investigation.

A collimated light source 26 is disposed on axis 13 at one end of the field area to provide a light beam directed at the cell assembly 11. Such perpendicular incidence minimizes refraction of the light within the assembly 11 in order that an accurate positioning of the ultimate light pattern may be obtained. Although the light pattern from cell 11 is readily visible to the naked eye, a telescope 27 is disposed on the opposite end of the cell assembly 11 from light source 26, and is directed at the cell along axis 13 to provide a magnified image thereof and, more importantly, to provide a means for an accurate line of sight where precision is needed in the location of the field center. The telescope 27 is equipped with crosshairs which are centered on the desired beam axis to which the magnet 12 is to be aligned. Thus, upon the exhibition of the magnet center line pattern by the cell system 11, the fine-positioning controls of the magnet 12 support mechanism may be adjusted appropriately to center the line pattern on the crosshairs of the telescope 27.

In the present embodiment of the invention the liquid cell 17 contains a colloidal solution of ferrous oxide ($Fe_3O_4$) which is one of a small group of colloidal solutions possessing the necessary magneto-optical activity to produce the previously mentioned Cotton-Mouton effect. Light incident on these solutions, when in the presence of a magnetic field having a component at right angles to the direction of propogation of the light, undergoes $R^5$ represents lower alkyl, e.g., methyl, ethyl, etc., and $X^5$ represents halogen, e.g., chlorine, bromine, etc. If desired, the N-lower alkyl and N-lower alkanoyl substituted double refraction in transmission therethrough. The double refraction is attributed to a lining up of the magnetically and optically anisotropic molecules or particles of the colloid in the applied magnetic field direction. Upon projecting plane polarized light through the solution, the plane of the wave vibration of the light will be rotated by the alignment of the colloidal molecular dipoles with the magnetic field lines. However, this will not occur where the angle of the polarizing plane is either parallel or perpendicular to the magnetic field lines in which cases there is no resultant force vector acting to rotate the dipoles and the light will remain plane polarized.

A quadrupole magnetic field such as field 28 possesses the property that any straight line passing through the center of symmetry of the field will cross all intersected field lines at the same angle. Therefore, when plane polarized light is projected through the ferrous oxide solution 17 in the transverse quadrupole field 28, at any angle of the polarizing plane of screen 14 there will always be two axes where elliptical polarization due to double refraction cannot occur. One axis will be composed of those points in the field 28 at which the field lines are parallel to the plane of the incoming polarized light. The other axis will be composed of the points at which the field lines are perpendicular to the plane of incoming polarized light. Due to the geometry of the quadrupole field configuration, the two axes intersect at the center of symmetry of the field.

Upon viewing the colloidal solution 17 through the analyzer screen 16, which is crossed with respect to the incoming polarization plane of the first screen 14, the analyzer 16 will have little filtering effect on the elliptically polarized light, which case prevails throughout most of the cell. However, along the axes where elliptical polarization did not occur and at the center field space where the field strength is zero, the crossed analyzer 16 will completely extinguish the plane polarized light. The two axes are thereby readily apparent in the solution as a dark cross on the light background, the intersection of which cross indicates the center of the quadrupole field.

Use of the device in the magnetic field between two conventional pole faces produces a single dark axis indicative of the medium plane of the field provided that the usual radial gradient is present in the field. In the case of the less common, higher order multiple-pole fields, the axis of the transverse field would be indicated by three intersecting lines for a sextapole, four for an octapole, etc.

Considering now the steps involved in practicing the invention, the cell assembly 11 is first positioned between the poles of the quadrupole magnet 12 as has been hereinbefore described. The magnet 12 is left unenergized initially. Collimated light from source 26 is projected through the assembly 11 and the telescope 27 is accurately aligned along the desired field axis and is focussed on the ferrous oxide cell 17. The light arriving at the cell 17 is plane polarized by the first polarizing screen 14. The second polarizing screen 16 is then rotated in the frame 18 until no light is transmitted by the cell system 11. At this angular position of the screen 16 the respective polarizing planes of the two screens are mutually crossed and the light is completely extinguished. The magnet 12 is then energized and the quadrupole magnetic field established thereby. Due to the Cotton-Mouton effect of the magnetic field upon the colloidal solution of the cell 17, elliptical polarization of the light will occur but will be prevented along the previously described orthogonal axes where the field lines are parallel and perpendicular to the incoming plane of polarization. The light from source 26 will thus remain extinguished through the cell system 11 along these axes while it is partially transmitted elsewhere therein. From the position of the telescope 27, the two orthogonal thin dark planes cutting through the liquid cell 17 are seen end-on and appear as a distinct crossed line pattern 29 and 29' as shown in FIGURE 2. The intersection of the axes 29 and 29' thereby exactly indicates the axis of symmetry of the quadrupole field 28 and where the locating is being done for the purpose of magnet alignment, the magnet 12 position is adjusted to center this intersection on the crosshairs of the observing telescope 27.

Thus the present invention provides a convenient, rapid, and highly accurate means of visibly indicating the magnetic center of complex fields and greatly simplifies the task of magnet alignment.

The invention may also be adapted for the measurement of magnetic field strength in a uniform field region. By introducing a bucking coil into the field and by disposing the ferrite cell within the coil, one can visually determine when the primary magnet field is cancelled by that of the coil since the transmission of light through cell 17 will cease at the null field value. Inasmuch as the bucking coil field can readily be determined from the circuit parameters thereof by methods well understood within the art, the invention provides a very convenient technique for field measurement.

While the invention has been described with respect to a particular embodiment thereof, it will be apparent to those skilled in the art that numerous variations and modifications are possible within the spirit and scope of the invention and thus it is not intended to limit the invention except as defined in the following claims.

What is claimed is:

1. In a method for precisely aligning the field axis of a charged particle beam focussing magnet with a predetermined desired particle path, the steps comprising:
    (a) sighting a fixed telescope along said predetermined path,
    (b) disposing said magnet with the magnet field axis thereof in approximate alignment with said path,
    (c) disposing a volume of liquid within the central field region of said magnet, said liquid being of the class which exhibits the Cotton-Mouton effect,
    (d) directing a light beam toward said telescope and along said axis, said light beam being directed through the field of said magnet and through said volume of liquid,
    (e) disposing a first polarizing screen in the path of said light beam at the side of said volume of liquid which is remote from said telecsope,
    (f) disposing a second polarizing screen in the path of said light beam at the side of said volume of liquid which is proximate to said telescope with the polarizing plane of the second screen crossed with the polarizing plane of the first screen,
    (g) viewing the resultant visible indication of the position of said field axis through said telescope, and
    (h) adjusting the position of said magnet to bring said visible indication of said field axis into coincidence with the line of sight of said telescope.

2. Apparatus for visually locating regions within a magnetic field at which the field is absent or parallel or perpendicular to a plane of plane polarized light, comprising:
    (a) a magneto-optical cell containing a substance exhibiting the Cotton-Mouton effect,
    (b) a source of said polarized light directed through said cell, said cell and the direction of said polarized light being transverse to the flux of said magnetic field, and
    (c) a polarizing screen disposed in the path of said light transmitted by said cell with the polarizing plane of said light source whereby the light pattern transmitted by said cell is indicative of the location of said regions.

3. Apparatus for visually locating null field regions within a magnetic field and regions where the field is parallel or perpendicular to a plane of polarization of light, comprising:
    (a) means retaining a light-transmissive colloidal solution within said field, said solution being of the class which exhibits the Cotton-Mouton phenomenon, said means having an optical passage therethrough which is disposed transverse to the flux of said magnetic field,
    (b) a light source directed through said optical passage, and
    (c) a pair of plane polarizing screens disposed on opposite sides of said solution, one of said screens being rotated relative to the other of said screens about the axis of said passage whereby the beam from said light source directed through said screens and said solution is extinguished in a pattern indicative of said regions.

4. Apparatus as described in claim 3 wherein said light-transmissive colloidal solution is comprised of ferrous oxide ($Fe_3O_4$).

5. Apparatus for visually locating the axis of the magnetic field of a charged particle beam focussing magnet comprising:
    (a) a magneto-optical cell having a non-magnetic container with transparent end windows, said cell being disposed in said field with said end windows transecting said axis and having a light-transmissive substance therein of the type which exhibits the Cotton-Mouton effect,
    (b) means for propagating a beam of light through said cell and through said end windows,
    (c) polarizer means disposed in the path of said light beam to plane polarize said beam prior to passage through said cell, and
    (d) analyzer means disposed in the path of said light beam to analyze said beam after passage through said cell, said analyzer means being rotatable relative to said polarizer means whereby plane polarized light which passes through said cell unchanged may be suppressed by said analyzer means, the resulting optical pattern seen therethrough being precisely indicative of the location of said axis.

6. Apparatus for precisely locating the axis of a magnetic field of the class having a null field along said axis comprising:
    (a) a source of light directed along said axis,
    (b) a volume of colloidal solution of a type which exhibits the Cotton-Mouton effect, said solution being disposed in said magnetic field across said axis, and
    (c) a pair of plane polarizing screens, the first of said screens being disposed between said light source and said volume of solution in substantially perpendicular relationship to said axis, the second of said screens being disposed in substantially perpendicular relationship to said axis on the opposite side of said volume of solution from said first screen, one of said screens being rotated relative to the other whereby plane polarized light which passes through said solution unchanged may be suppressed from appearing at the side of said second screen opposite said solution thereby forming an optical pattern indicative of the exact position of said axis.

7. In a means for aligning the magnetic field centerline of a multi-pole particle focussing lens along a desired linear particle path, the combination comprising:
    (a) a light source disposed to direct a light beam substantially along said particle path,
    (b) a magneto-optical cell containing a light-transmissive solution which exhibits the Cotton-Mouton effect disposed within said magnetic field of said lens and in the path of said light beam, (c) a telescope disposed to view said cell from the opposite end thereof from said light source, said telescope having the optical axis thereof coincident with said desired particle path and the desired location of the centerline of said magnetic field, and (d) a pair of plane polarizing screens disposed in the path of said light beam and separated by said cell, the respective planes of polarization of said screens being perpendicular whereby the pattern of light visible through said telescope is indicative of said centerline of said field and said focussing lens may be readily located to bring said centerline into coincidence with said particle path.

8. In apparatus for visually locating the axis of a magnetic field of the class having a null field along said axis the combination comprising:

(a) a cylindrical flask formed of non-magnetic material and having transparent opposite end windows, said flask being disposed in said magnetic field in a substantially coaxial relationship to said axis, (b) a colloidal solution contained in said flask, said solution being of the class which exhibits the Cotton-Mouton effect, (c) a pair of circular polarizing screens rotatably mounted on said flask at the opposite end windows thereof in coaxial relationship to said flask whereby said screens may be selectively oriented with the respective polarizing planes thereof being mutually perpendicular, and (d) a light source directing a beam of light through said cell and said screens along the axis of said field.

References Cited

Dillon et al., Visual Observations of Magnetostatic Modes, Applied Physics Letters, vol. 2, No. 319, Jan. 1963, p. 38.

RUDOLPH V. ROLINEC, *Primary Examiner.*

R. J. CORCORAN, *Assistant Examiner.*